Oct. 26, 1926. 1,604,909
W. L. GRIFFIN
EMERGENCY BRAKE FOR MOTOR VEHICLES
Filed July 14, 1925    4 Sheets-Sheet 2

Inventor
W. L. Griffin.
By
Attorney

Oct. 26, 1926.
W. L. GRIFFIN
1,604,909
EMERGENCY BRAKE FOR MOTOR VEHICLES
Filed July 14, 1925 4 Sheets-Sheet 3
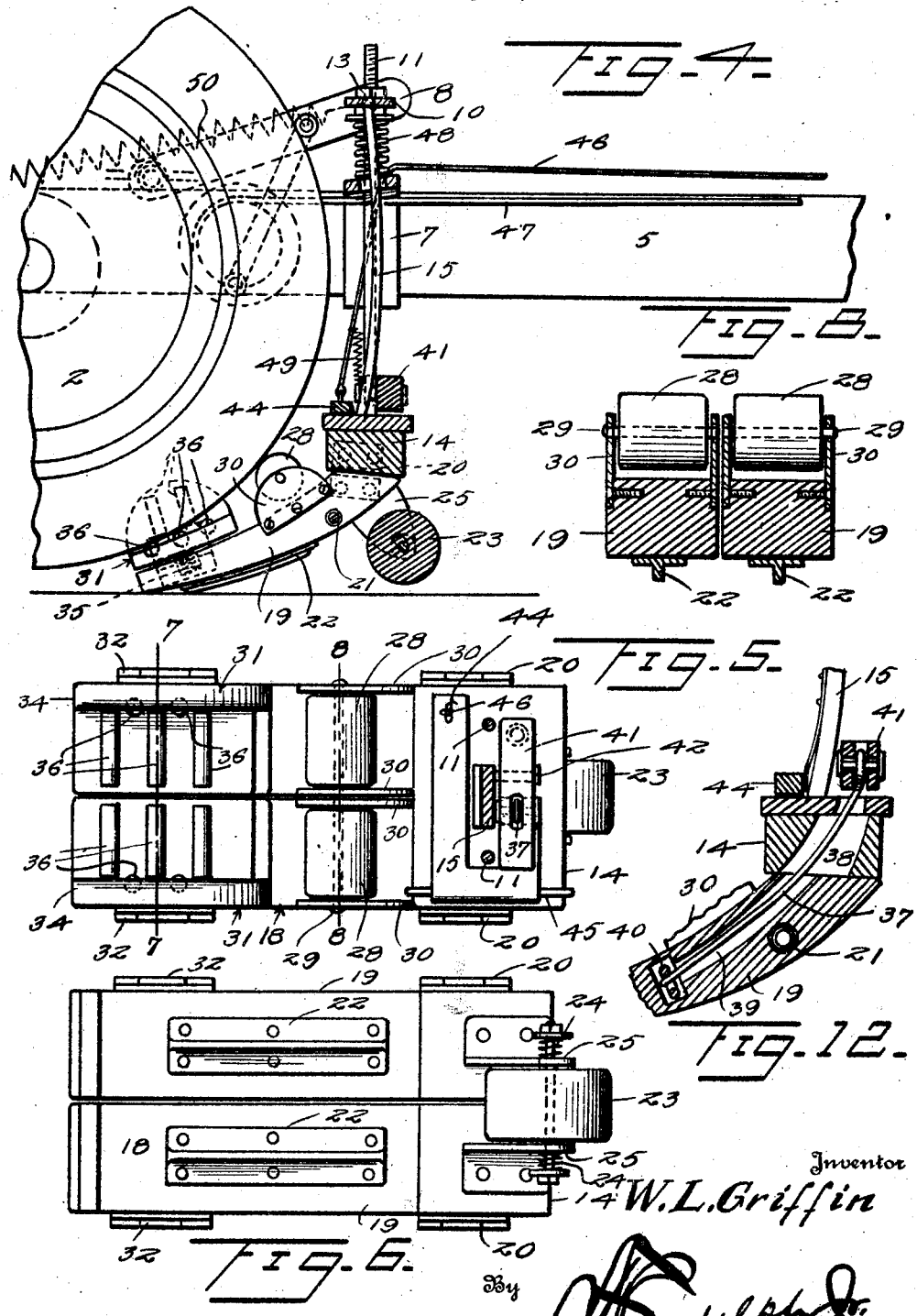
Inventor
W. L. Griffin Oct. 26, 1926.  
W. L. GRIFFIN  
1,604,909  
EMERGENCY BRAKE FOR MOTOR VEHICLES  
Filed July 14, 1925   4 Sheets-Sheet 4
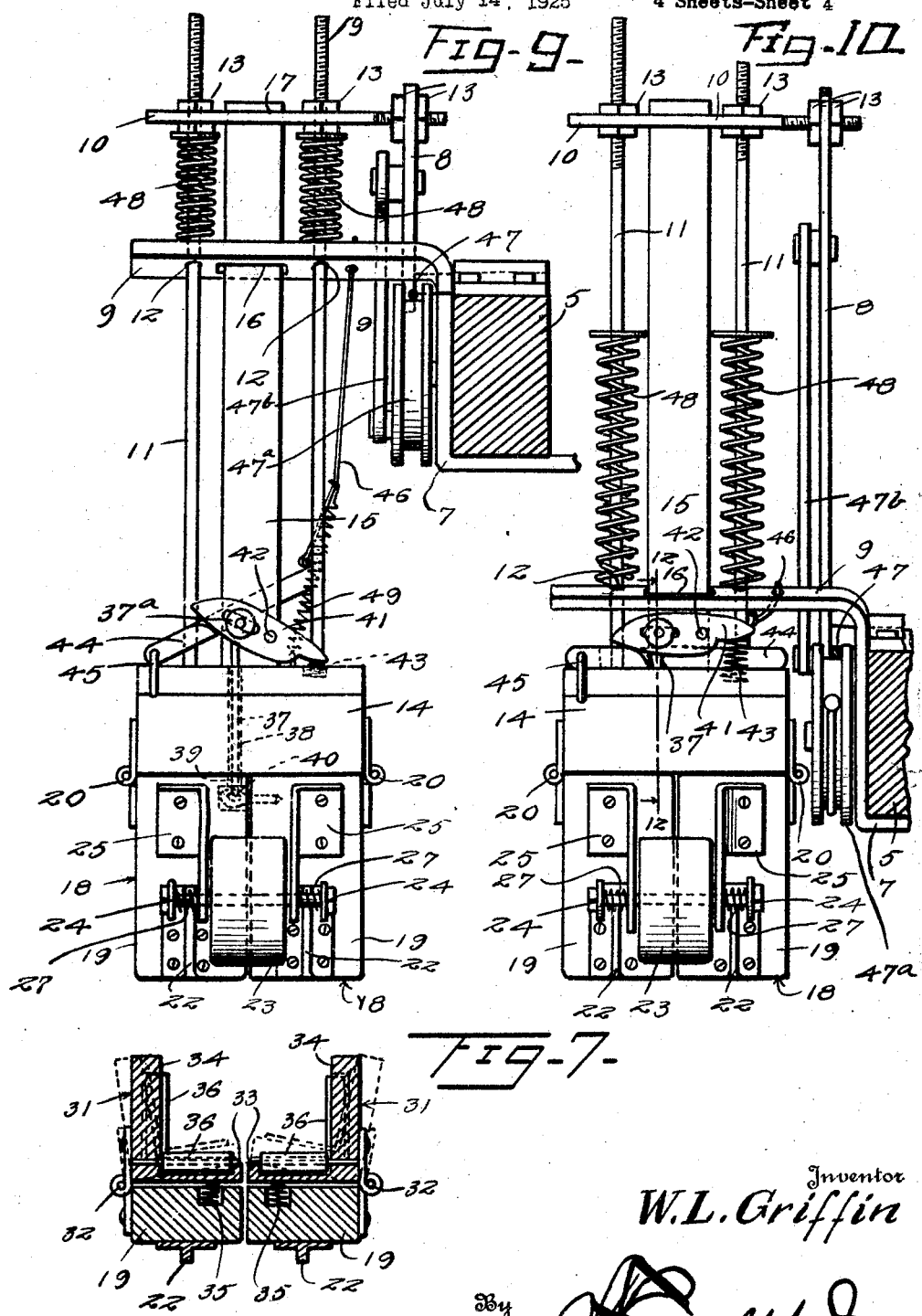
Inventor  
W. L. Griffin
By   
Attorney Patented Oct. 26, 1926.

1,604,909

UNITED STATES PATENT OFFICE.

WILLIAM L. GRIFFIN, OF BEACON, NEW YORK.

EMERGENCY BRAKE FOR MOTOR VEHICLES.

Application filed July 14, 1925. Serial No. 43,530.

Figure 1:
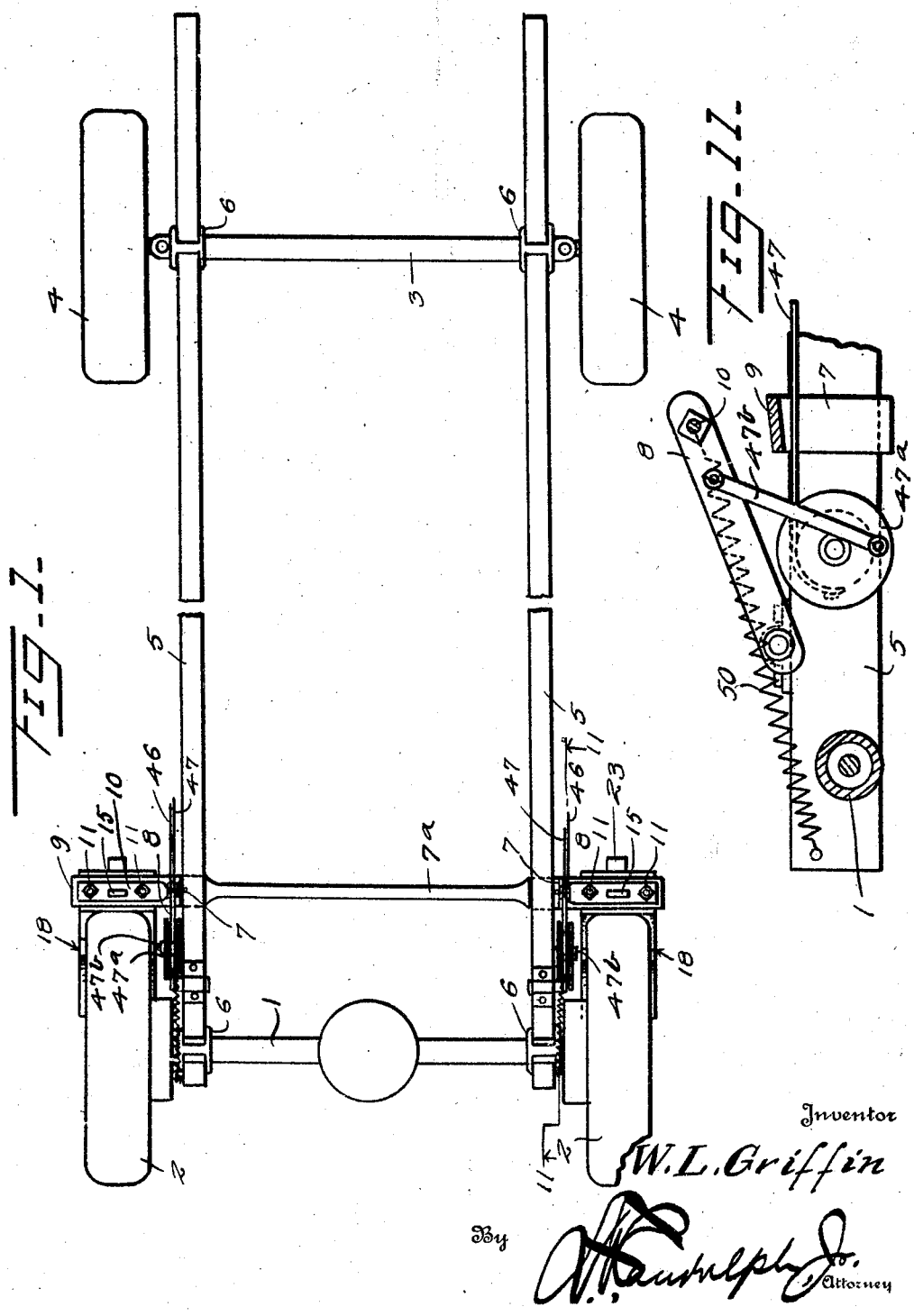
Figure 2:
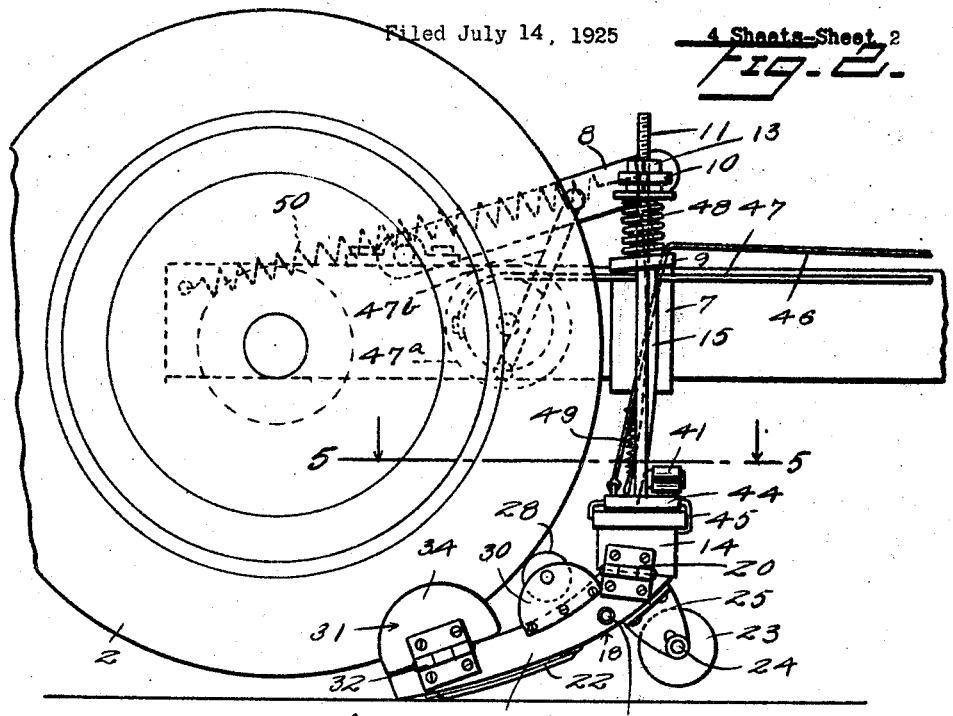
Figure 3:
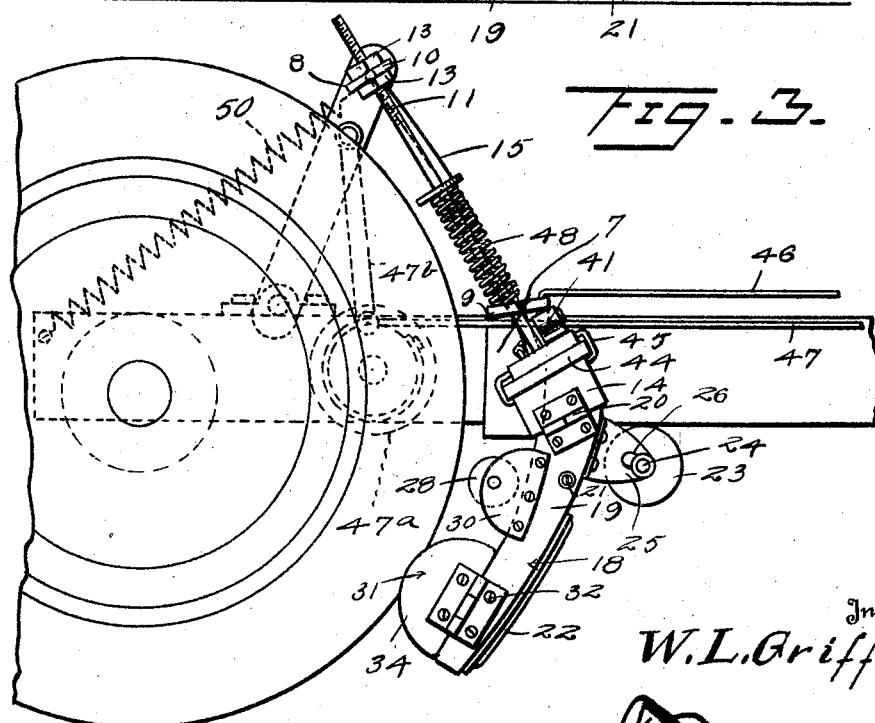

This invention relates to brakes for motor vehicles, and it consists of the novel construction, combination and arrangement of parts hereinafter fully described and claimed, and illustrated in the accompanying drawings, wherein:

Figure 1 is a top plan view of the running gear of a motor vehicle equipped with brakes embodying my invention, Figure 2 is an elevational view illustrating one of the brakes applied, Figure 3 is a similar view of the brake retracted, Figure 4 is a view similar to Figure 2 with the brake in vertical section, Figure 5 is a sectional view taken on the plane indicated by the line 5—5 of Figure 2, Figure 6 is a bottom plan view of one of the brake shoes, Figure 7 is a sectional view taken on the plane indicated by the line 7—7 of Figure 5, Figure 8 is a similar view taken on the plane indicated by the line 8—8 of Figure 5, Figure 9 is a view in front elevation of the brake applied, Figure 10 is a similar view of the brake retracted, Figure 11 is a sectional view taken on the plane indicated by the line 11—11 of Figure 1, and Figure 12 is a similar view taken on the plane indicated by the line 12—12 of Figure 10.

Corresponding and like parts are referred to in the following description, and designated in the several views of the accompanying drawings, by similar reference characters.

In the drawings 1 designates the rear axle housing, 2 the driving wheels, 3 the front axle, and 4 the steering wheels of the running gear of a motor vehicle.

In accordance with my invention beams 5 are secured by clamps 6 to the axle housing 1 and axle 3. A bracket 7 is secured to each beam 5 in advance of each drive wheel 2, and a lever 8 is pivoted to each beam in rear of each bracket. The brackets 7 are connected together by a cross bar 7ª. The bracket 7 and lever 8 are provided with outwardly directed arms 9 and 10, respectively, the lever arm 10 occupying a position above the bracket arm 9. Rods 11 passing freely through openings 12 in the bracket arm 9 are secured to the lever arm 10 by nuts 13. A block 14 is secured to the lower ends of the rods 11, and a bar 15 passing freely through a slot 16 in the bracket arm 9 is secured at its lower end to the block 14 and has its upper end positioned in a slot 17 in the lever arm 10.

A brake shoe 18 is carried by the block 14. On the actuation of the lever 8 in one direction the brake shoe 18 is moved into contact with the ground beneath the driving wheel 2 and on the actuation of the lever 8 in the reverse direction the brake shoe 18 is raised out of contact with the ground and driving wheel. The brake shoe 18 is of arcuate formation, and comprises similar sections 19. The sections 19 are pivoted as at 20 to the ends of the block 14 to permit the brake shoe to expand laterally while it is being withdrawn from in contact with the wheel. The brake shoe members 19 are yieldingly held in contracted or normal condition by a spring 21 which is mounted within and extends transversely of said members.

Ribs 22 are secured to the bottom sides of the brake shoe members 19 to prevent skidding of the brake shoe. A ground engaging wheel 23 is journaled on an axle 24 carried by brackets 25 secured to the bottom sides of the brake shoe members 19. The axle receiving openings 26 in the brackets 25 are elongated in order to prevent the axle 24 from interfering with the expansion of the brake shoe. Springs 27 mounted on the axle 24 and contacting with the brackets 25 prevent casual endwise movement of the axle with respect to the brackets.

Rollers 28 are journaled at the top sides of the brake shoe members 19 on shafts 29 carried by flanges 30 extending upwardly from the lateral sides of said members. The rollers are journaled near the front end of the brake shoe 18 and contact with the drive wheel when the brake is applied. Clamps 31 located rearwardly of the rollers 28 are pivoted to the brake shoe members 19 as at 32. The clamps 31 are adapted to engage the periphery and sides of the tire of the wheel when the brake is applied. The clamps 31 are angular in cross section presenting bottom members 33 overlying the brake shoe members 19 and side members 34. When the brake is applied the tire of the wheel contacts with the members 33 and forces the members 34 into contact with the sides thereof whereby to prevent any relative lateral movement between the wheel and brake shoe. Springs 35 yieldingly support the clamp members 31 with their parts 34 in outwardly flared relation so as to permit the application of the brake without interference from the tire of the wheel. The clamps 31 are provided with rollers 36 to reduce to the minimum the wear on the tire during the application of the brake.

A pin 37 slidably mounted in a slot 38 in the head 14 and a slot 39 in one of the brake shoe members 19, engages an eye 40 carried by the other brake shoe member and holds said members against casual lateral separation. The pin 37 is pivoted at its upper end as at 37ª to a lever 41 which is pivoted intermediate its ends as at 42 to the bar 15. A spring 43 yieldingly holds the pin 37 in engagement with the eye 40. A lever 44 pivoted as at 45 to the head 14 and contacting with the lever 41 provides means by which the pin may be withdrawn from the eye 40 when it is desired to withdraw the brake. A cable 46 connected at one end to the lever 44 provides means by which this lever may be actuated when it is desired to withdraw the pin 37 from the eye 40. A cable 47, a drum 47ª journaled on the beam 5 and to which the cable 47 is connected, and a link 47ᵇ pivoted to the drum 47ª and lever 8, provide means by which the lever 8 may be rocked when it is desired to apply the brake. To prevent the too sudden application of the brake shoe 18 cushioning springs 48 are mounted upon the rods 11 between the bracket arm 9 and lever arm 10. A spring 49 is connected at one end to the lever 41 and at its other end to the block 14, and a brake retracting spring 50 is secured to the beam 5 and lever 8.

The brakes are so mounted that they may be readily applied and retracted. When the brakes are applied the shoes 18 occupy a position between the ground and the driving wheels 2, and the weight of the driving wheels is directly upon the shoes 18 with the result that there is no possibility of skidding. When it is desired to apply the brakes it is only necessary to exert a forward pull upon the cables 47. By releasing the cables 47 and exerting a forward pull upon the cables 46, the brakes will be restored to retracted position, in which position they will be held by the springs 50. During the initial pull upon the cables 46, the pins 38 are withdrawn from the eyes 40, with the result that the brake shoes 18 are released from their clamping engagement with wheels 2. This enables the brakes to be readily moved into retracted position. During the final phase of the movement of the brakes into retracted position the levers 41 and 44 are rocked downwardly by the bracket arms 9, with the result that the pins 37 are forced through the eyes 40 and the brake shoe members again locked against lateral retraction.

From the foregoing description, taken in connection with the accompanying drawings, the advantages of the construction and the method of operation will be readily apparent to those skilled in the art to which the invention appertains. While I have described the principle of operation of the invention, together with the device which I now consider to be the best embodiment thereof, I desire to have it understood that the device shown is merely illustrative, and that such changes may be made when desired as are within the scope of the invention as claimed.

What is claimed is:

1. A brake for a motor vehicle, comprising brackets secured to the vehicle near opposite wheels thereof, levers pivoted to the vehicle and provided with arms, rods slidably associated with the brackets and fixed to the lever arms, shoes carried by the rods, drums journaled on the vehicle, links connected to the drums and levers, cables connected to the drums, springs connected to the levers and vehicle.

2. A vehicle brake comprising a lever, a drum, a link pivoted to the drum and lever, a shoe, means connecting the shoe to the lever, a spring engaging the lever, and a cable connected to the drum.

3. A vehicle brake including a block, shoe members pivoted to the block for lateral separation, a spring holding the shoe members together, a wheel clamp carried by each shoe member, and retractible means for positively holding the shoe members against lateral separation.

4. A vehicle brake including a block, shoe members pivoted to the block for lateral separation, a spring holding the shoe members together, a wheel clamp carried by each shoe member, a wheel contacting roller carried by each shoe member, a ground contacting roller carried by the shoe members, and retractible means for positively holding the shoe members against lateral separation.

5. A vehicle brake including a block, shoe members pivoted to the block for lateral separation, means yieldingly holding the shoe members together, a wheel clamp pivoted to each shoe member, and retractible means for positively holding the shoe members against lateral separation.

6. A vehicle brake including a block, shoe members pivoted to the block for lateral separation, means yieldingly holding the shoe members together, a wheel clamp carried by each shoe member, an eye carried by one of the shoe members, a pin carried by the block and other shoe member for engagement with the eye, a lever pivoted to the block and having a pin pivotally connected thereto, a spring positioned between the lever and block, and a second lever pivoted to the block and contacting with the first lever.

7. A vehicle brake including a block, shoe members pivoted to the block for lateral separation, means yieldingly holding the shoe members together, a wheel clamp carried by each shoe member, an eye carried by one of the shoe members, a pin carried by the block and other shoe member for engagement with the eye, a lever pivoted to the block and having a pin pivotally connected thereto, a spring positioned between the lever and block, a second lever pivoted to the block and contacting with the first lever, a bracket arm secured to the vehicle, a rod connected to the block and slidably associated with the bracket arm, brake applying means connected to the rod, and a cable connected to the second lever.

8. A vehicle brake including a lever, a drum, a link pivoted to the drum and lever, a shoe connected to the lever, means normally retaining the shoe in retracted position, and means connected to the drum for moving the shoe into projected position.

9. A vehicle brake including a shoe embodying laterally movable wheel embracing members, means for yieldingly holding the members together, and retractible means for positively holding the members together.

In testimony whereof I affix my signature.

WILLIAM L. GRIFFIN.